United States Patent [19]

Frances

[11] Patent Number: 5,391,623
[45] Date of Patent: Feb. 21, 1995

[54] ELASTOMER/ARAMID FIBER DISPERSION

[75] Inventor: Arnold Frances, Wilmington, Del.

[73] Assignee: E. I. Du Pont de Nemours and Company, Wilmington, Del.

[21] Appl. No.: 45,781

[22] Filed: Apr. 14, 1993

[51] Int. Cl.⁶ ............................................. C08K 3/36
[52] U.S. Cl. ................................... 525/184; 525/431; 524/514
[58] Field of Search ................ 525/184, 431; 524/514

[56] References Cited

U.S. PATENT DOCUMENTS

| | | | |
|---|---|---|---|
| 4,514,541 | 4/1985 | Frances | 524/514 |
| 4,543,377 | 9/1985 | Crossman | 524/13 |
| 4,659,754 | 4/1987 | Edwards et al. | 525/214 |
| 4,833,191 | 5/1989 | Brushway | 524/473 |
| 4,871,004 | 10/1989 | Brown | 152/209 |

FOREIGN PATENT DOCUMENTS

| | | |
|---|---|---|
| 0272459 | 11/1987 | European Pat. Off. |
| 2147589A | 5/1985 | United Kingdom |

*Primary Examiner*—James J. Seidleck
*Assistant Examiner*—I. Zemel

[57] ABSTRACT

A process is disclosed for preparing a masterbatch composition of elastomer with a high concentration of aramid fibers, as the sole particulate component, distributed therethroughout.

5 Claims, No Drawings

ELASTOMER/ARAMID FIBER DISPERSION

BACKGROUND OF THE INVENTION

1. Field of the Invention

This invention relates to an elastomeric composition consisting essentially of an elastomer and a high concentration of aramid fibers with no reinforcing filler or particulate additives. The composition is useful as a masterbatch to facilitate the blending of aramid fibers into elastomers. The invention also relates to a process for making the elastomeric composition.

2. Description of the Prior Art

U.S. Pat. No. 4,514,541, issued Apr. 30, 1985 on the application of Frances, discloses a masterbatch composition of elastomer, aramid pulp, and reinforcing filler. Reinforcing filler materials are required and they are combined with the pulp before dispersion of the pulp into an organic solvent solution of the elastomer in order to facilitate dispersion of the pulp for the elastomer. This patent stands as a teaching that filler material is required for successful dispersion of pulp into the elastomer.

U.S. Pat. No. 4,543,377, issued. Sep. 24, 1985 on the application of Crossman, discloses a process for making a dispersion of pulp materials in a polymer. The dispersion is made by blending an aqueous mixture of the pulp with an organic solvent solution of the polymer and removing the water and organic solvent after the pulp transfers from the aqueous phase to the organic phase.

Great Britain Patent application 2,147,589-A, published May 15, 1985, discloses a composition comprising aramid pulp and rubbery polymer. It is definitely stated that the composition cannot be made at pulp concentrations greater than about 20 parts of fiber per 100 parts of polymer; and that a maximum of about 12 parts fiber per 100 parts of polymer is preferred.

SUMMARY OF THE INVENTION

The present invention provides a process for preparing a composition consisting essentially of elastomer with, as a sole particulate component, short aramid fibers homogeneously distributed through-out, comprising the steps of; dissolving elastomer in organic solvent to make an elastomer solution, dispersing aramid fibers in the elastomer solution, and evaporating the organic solvent from the dispersion of the aramid fibers in the elastomer.

There is, also, provided a masterbatch composition consisting essentially of elastomer with, as a sole particulate component, aramid fibers homogeneously distributed uniformly throughout wherein the aramid fiber particles have an average length of about 0.1 to 6 millimeters and the aramid fibers represent about 30 to 300 weight parts per hundred parts of elastomer.

DETAILED DESCRIPTION OF THE INVENTION

The masterbatch composition of this invention utilizes an unusually high concentration of aramid fibers in the elastomer matrix. While it has been well known to make compositions with low concentrations of fibers in the elastomer and well known to make compositions with higher concentrations of fibers so long as a filler or partitioning material was used, it has not, before, been known to make masterbatch compositions with high concentrations of fibers and no filler material.

Aramid fibers, as discussed herein relating to this invention, include aramid pulp and short aramid fibers known as floc. Aramid floc is made by cutting continuous aramid fiber into short lengths from about 0.1 to 6 millimeters. Aramid pulp is made by refining aramid fibers and has a distribution of lengths up to about 8 millimeters with an average length of about 0.1 to 4 millimeters. For practice of this invention, aramid pulp is preferred and the term pulp will be used hereinafter referring to both pulp and floc.

The elastomers which can be used in practice of this invention include both, natural rubber and synthetic rubbery compounds. Synthetic rubbery compounds can be any which are dissolved by common organic solvents and can include, among many others, polychloroprene and sulfur-modified chloroprene, hydrocarbon rubbers, butadiene-acrylonitrile copolymers, styrene butadiene rubbers, chlorosulfonated polyethylene, fluoroelastomers, polybutadiene rubbers, polyisoprene rubbers, and the like.

Organic solvents which can be used are any which safely and effectively dissolve an amount of the elastomer necessary to yield a solution of elastomer. Eligible solvents are aliphatic and aromatic, polar and nonpolar solvents, including, among many others, acetone, toluene, ethylmethylketone, hexane, cyclohexane, naphtha, and the like. A solvent should be used which will readily dissolve the elastomer, preferably but not necessarily at temperatures of 15°–25° C. Smaller amounts of solvent are preferred for facilitating removal of the solvent from the composition during preparation and for recovery of the solvent during the solvent removal.

This invention utilizes and is limited to aramid fibers which include, as a preferred material, aramid pulp. By aramid pulp is meant a synthetic pulp, for example, as made by mechanical shattering of fibers derived from high strength, high modulus aromatic polyamide fibers such as those described in U.S. Pat. No. 3,869,429 and 3,869,430. Particularly preferred is aramid pulp derived from poly(p-phenylene terephthalamide) fibers. Aramid pulp is preferably made using pulp refining methods similar to those of the paper industry. The aramid fibers are shattered both transversely and longitudinally to provide fibers having a length which depends on the degree of refinement. Attached to these fibers are fine fibrils which have a diameter as small as 0.1 micrometer as compared with a diameter of about 12 micrometers for the main (trunk) part of the fiber. Aramid pulp particles have the appearance of hairy fibers.

Preparation of the composition of this invention is relatively simple but is counter to the teachings of the prior art. First, an elastomer resin is dissolved in enough of the organic solvent to yield a complete solution. Generally, when compositions of 30 to 100 weight parts of aramid pulp per hundred parts resin (phr) or thereabouts, are being made, the elastomer solution will have from 1 to 4 weight parts of solvent for each part of elastomer. When compositions of higher aramid pulp—say 200 to 300 phr—are being made, the elastomer solution could have 10 to as much as 20 weight parts of solvent for each part of elastomer. The solution is prepared by conventional means using well known agitation or stirring forces and heat, as required or desired for any particular situation.

Once the solution is completed, the aramid pulp is added with agitation forces as necessary to afford complete dispersion of the individual pulp particles. In pulp dispersion processes of the past, it was believed that reinforcing filler or partitioning particles had to be combined with the pulp, as dispersing aids, before the pulp could be dispersed in the elastomer, to accomplish complete dispersion of the pulp particles. It has now been discovered that such filler or partitioning particle dispersing aids are not necessary-for complete dispersion. It should be made clear that it is not necessary to wait for the elastomer to be completely dissolved before dispersing the pulp in the solution. The pulp can be added before the elastomer is completely dissolved; and can even be combined with dry particles of the elastomer before adding the solvent. As the solvent dissolves the elastomer, the pulp becomes dispersed in the elastomer solution. It should be emphasized that the element of the present invention, which is believed to be novel and patentable, is the, heretofore unrecognized, capability to achieve substantially complete dispersion of aramid pulp without the use of any other particulate materials to serve as aids in dispersing the pulp.

Once the pulp has been dispersed in the elastomer solution, the solvent is evaporated from the dispersion, preferably, but not necessarily, under continued agitation forces. Removal of the solvent can be facilitated by heating the dispersion and using forced air or inert gas or by applying a vacuum. It is a surprising result of the process of this invention that the composition of elastomer and aramid pulp crumbles to small particles as the solvent is driven out of the system under continued agitation forces. At relatively low aramid pulp concentrations—like 20-30 phr—the composition crumbles into small particles; but at higher concentration—greater than about 50 phr—the composition forms into flakes and the composition particle size, while clearly a function of the details of the process and the product composition, is small and quite manageable, on the order of a few centimeters in average diameter. The particles typically take the form of crumbs or flakes which vary in size from less than a centimeter to several centimeters, and more typically, from a centimeter to about three centimeters in length. At aramid pulp concentrations of about 50 to 150 phr, the particles are generally flake-like, having a thickness of about 0.05 to 2 millimeters, more usually 0.1 to 0.6 millimeter, and a length to width (aspect) ratio of from about 1 to about 30. Generally, the particle size is smaller as the concentration of pulp in the composition is increased; and at pulp concentrations of greater than about 150 phr, the particles are generally less flake-like and more fibrous.

The crumb or flake nature of this product has been found to be surprising, unique, and quite useful. The thin flake-like particles are easily dried, are easily handled and packaged and, in the high surface area flake form, are readily compounded with other elastomer materials. This product of the invention, in crumb or flake form, is ready for compounding with other elastomers as a masterbatch. It should be noted that at aramid pulp concentrations of greater than about 200 phr, the quality of dispersion is somewhat decreased.

While the masterbatch product of this invention consists essentially of elastomer and aramid pulp, it may include small amounts of nonparticulate additives such as plasticizers, tackifiers, stabilizers, cure agents, antioxidants and the like, which do not affect the dispersing of the aramid pulp in the elastomer.

An initial measure of quality in the product of this invention is in the homogeneity of the aramid pulp elastomer dispersion. The homogeneity is easily directly measured by observation of a sample of the composition flattened under heat and pressure.

Dispersion Quality. To evaluate the degree of homogeneity of aramid pulp dispersion, a small sample of the composition (about 0.5 gram) is placed between thick plates and a pressure of about 100 megaPascals is applied. At that pressure, the sample is heated to 120° C. (250° F.), maintained at that temperature for about five minutes, and then cooled to about 25 C. The sample, flattened to an adequate thinness, can be observed with transmitted light for quality of dispersion. A fully dispersed product exhibits no fiber clumps to the naked eye.

The actual value and effectiveness of the invention is measured by how well the process of this invention facilitates the dispersion of aramid pulp in a final compound.

DESCRIPTION OF THE PREFERRED EMBODIMENTS

EXAMPLE 1

In the conduct of this example, aramid pulp was dispersed into solutions of several elastomers and the quality of the dispersions was determined.

The elastomers were as follow:
A. "Nordel ® 2522" (a sulfur-curable, low viscosity hydrocarbon rubber sold by E. I. du Pont de Nemours & Co.)
B. "Hypalon ® 100" (a chlorosulfonated polyethylene sold by E. I. du Pont de Nemours & Co.).
C. "Neoprene GW" (a polychloroprene sold by E. I. du Pont de Nemours & Co.)
D. Natural Rubber
E. "PS 2400" (a silicone elastomer sold by Precision Silicone Co.).
F. "Viton ® B-200" (a fluoroelastomer sold by E. I. du Pont de Nemours & Co.).

Solutions for all of the elastomers except the Natural Rubber and the Viton ® B-200 were made by dissolving 1 weight part of the elastomer into 4 weight parts of the solvent. For the Natural Rubber, 1 weight part of the rubber was dissolved into 6 weight parts of the solvent; and, for the Viton ® B-200, 1 weight part of the elastomer was dissolved in 2 weight parts of the solvent.

The aramid pulp used in this example was a pulp of poly(p-phenylene terephthalamide) sold by E. I. du Pont de Nemours & Co. under the tradename Kevlar ®, merge 6F543.

The desired amount of aramid pulp was dispersed into a portion of the elastomer solutions and the solvent was evaporated from the dispersion. The aramid pulp concentrations ranged from 35 to 100 weight parts per hundred weight parts of elastomer (phr) and the solvents were hexane, toluene and acetone, as indicated in Table 1. The compositions and results of the dispersion are shown in Table 1.

TABLE 1

| Example | Elastomer | Solvent | Pulp Conc |
|---------|-----------|---------|-----------|
| 1-1 | A | Hexane | 35 phr |
| 1-2 | A | Hexane | 50 |
| 1-3 | A | Hexane | 75 |
| 1-4 | A | Hexane | 100 |
| 1-5 | A | Toluene | 35 |
| 1-6 | A | Toluene | 50 |
| 1-7 | A | Toluene | 75 |
| 1-8 | B | Toluene | 75 |
| 1-9 | C | Toluene | 75 |

TABLE 1-continued

| Example | Elastomer | Solvent | Pulp Conc |
|---|---|---|---|
| 1-10 | D | Toluene | 75 |
| 1-11 | E | Toluene | 75 |
| 1-12 | F | Acetone | 35 |

In all of the dispersion tests described above, the Dispersion Quality was very good. All flattened samples of the dispersions revealed homogeneous distribution of the aramid pulp throughout the elastomer. These compositions and other compositions of this invention find use as masterbatch materials to be compounded with other elastomer components as a means for introducing a completely dispersed pulp component into elastomer products.

When it is attempted to disperse aramid pulp into elastomers without dissolving the elastomer in solvent, the dispersion of pulp is uneven and incomplete with the pulp remaining in clumps.

The aramid pulp can be completely dispersed in the elastomers by means of the prior art process wherein the pulp is first combined with a finely-divided reinforcing filler, such as carbon black and the combination of pulp and filler is then blended with a solution of the elastomer. In that prior art process, however, the aramid pulp masterbatch must always include a reinforcing filler; and, in the present invention, a masterbatch is made without the reinforcing filler using the aramid pulp as the only particulate material.

The present invention permits preparation of a masterbatch of homogeneously dispersed aramid pulp without the presence of, or the need for, any other particulate material.

EXAMPLE 2

In order to investigate the Dispersion Quality of masterbatch compositions of this invention at high concentrations of aramid pulp, the elastomer identified as Nordel® 2522 in EXAMPLE 1, the aramid pulp from EXAMPLE 1, and hexane as the solvent, were combined in the same way as described in EXAMPLE 1 with concentrations of pulp and solvent indicated in Table 2.

TABLE 2

| Example | Solvent/ Elastomer | Pulp Conc. | Dispersion Quality |
|---|---|---|---|
| 2-1 | 6:1 | 150 | Good |
| 2-2 | 6:1 | 200 | Good |
| 2-3 | 10:1 | 200 | Good |
| 2-4 | 10:1 | 300 | Fair |
| 2-5 | 20:1 | 500 | No |

"Good" means no fiber clumps;
"Fair" means some fiber clumps; and
"No" means no light transmission.

EXAMPLE 3

As a demonstration of the utility and effectiveness of the masterbatch of this invention, several of the compositions from EXAMPLES 1 and 2 were compounded into elastomer samples and cured. The cured samples were tested and evaluated with regard to quality of the pulp dispersion.

The curable elastomer formulation was, as follows, with the amount of masterbatch adjusted to provide aramid pulp in an amount of 20 phr:

| Component | phr |
|---|---|
| Nordel® 2522 | 80 |
| Neoprene FB | 20 |
| "HiSil 233" | 35.5 |
| Aramid pulp | 20 |
| Zinc oxide | 5 |
| Sulfur | 1.5 |
| MBT | 1 |
| Methyl tuads | 0.5 |
| Butyl zimate | 2 |

"Neoprene FB" is a low viscosity chloroprene elastomer sold by E. I. dupont de Nemours and Company.
"HiSil 233" is a precipitated silica sold by PPG, Inc.;
"MBT" is 2-mercaptobenzothiazole sold by R. T. Vanderbilt;
"Methyl tuads" is Tetramethylthiuram Disulfide sold by R. T. Vanderbilt;
"Butyl zimate" is zinc dibutyldithiocarbamate sold by R. T. Vanderbilt.

The compositions were mixed for 1-3 minutes at 200°-240° F. at low speed in a Banbury mixer, were further mixed on a 2-roll roll mill for 3-5 minutes, and, then, were sheeted off at a thickness of about 2 millimeters. Details of the compositions are presented in Table 3.

TABLE 3

| Examples | Masterbatch Composition | Dispersion Appearance |
|---|---|---|
| 3-1 | 1-1 | Uniform |
| 3-2 | 1-2 | Uniform |
| 3-3 | 1-3 | Uniform |
| 3-4 | 1-4 | Uniform |
| 3-5 | 2-1 | Uniform |
| 3-6 | 2-2 | Nonuniform |
| 3-7 | 2-3 | Uniform |
| 3-8 | 2-4 | Uniform |
| 3-9 | 2-5 | Nonuniform |
| Control | — | Nonuniform |

[1]"Uniform" means that there were no undispersed fibers.
[2]"Nonuniform" means that the compound was speckled with clumps of undispersed pulp.

The control composition was made in the same manner as the others of this example, with the exception that the aramid pulp was dispersed directly into the elastomer without the benefit of any masterbatch component.

EXAMPLE 4

This example represents an additional demonstration of the effectiveness of the dispersion of this invention as a masterbatch composition. For this example, the elastomer was Neoprene GRT, a chloroprene sold by E. I. duPont de Nemours and Company.

A dispersion composition was made using an elastomer solution of 4 weight parts toluene and 1 weight part elastomer, the pulp of EXAMPLE 1 in an amount to yield 50 phr, and the procedure of this invention from EXAMPLE 1.

That dispersion was compounded, by the procedure of EXAMPLE 3 at 170°-220° F., in the following formulation, with the amount of masterbatch dispersion adjusted to provide aramid pulp in an amount of 5 phr:

| Component | phr |
|---|---|
| Neoprene GRT | 100 |
| N 990 Black | 45.5 |
| "Sundex 790" | 10 |
| Zinc Oxide | 5 |
| Aramid Pulp | 5 |
| "Maglite D" | 4 |
| AC PE 617A | 3 |
| Octamine | 2 |

-continued

| Component | phr |
| --- | --- |
| Stearic Acid | 1 |

"N 990 Black" is carbon black sold by R. T. Vanderbilt;
"Sundex 790" is aromatic oil (ASTM D 2226, Type 101), sold by R. E. Carroll Corp.;
"Maglite D" is magnesium oxide sold by Whitaker, Clark and Daniels;
"AC PE 617A" is a polyethylene processing aid sold by Allied Chemical;
"Octamine" is a mixture of octylated diphenyl and amine antioxidant sold by R. T. Vanderbilt.

The control composition was made in the same manner as the composition of the invention with the exception that the aramid pulp was dispersed directly into the elastomer without the benefit of any masterbatch component.

Aramid pulp in the composition of the invention was uniformly dispersed throughout the elastomer with no clumps of pulp noticeable to the naked eye. The control composition, on the other hand, was speckled with clumps of aramid pulp which were not uniformly dispersed in the elastomer.

EXAMPLE 5

In this Example, the composition identified as 1-7 from EXAMPLE 1 was compounded as described in, and in accordance with the formulation of, EXAMPLE 3, and samples of the cured compositions were tested for break strength, modulus, and elongation at break.

There was a control which included no pulp and a comparison which included 20 phr of aramid pulp compounded directly into the composition without the benefit of any masterbatch component. Results of the tests are presented in Table 5.

TABLE 5

|  | Control | Comparison | This Invention |
| --- | --- | --- | --- |
| Machine Direction |  |  |  |
| Modulus at 5% Elongation (psi) | 131 | 1631 | 2164 |
| Break Strength (psi) | 1149 | 2104 | 2475 |

TABLE 5-continued

|  | Control | Comparison | This Invention |
| --- | --- | --- | --- |
| Elongation (%) Cross machine Direction | 277 | 12 | 7 |
| Modulus at 5% Elongation (psi) | 119 | 216 | 352 |
| Break Strength (psi) | 998 | 888 | 1063 |
| Elongation (%) | 323 | 60 | 57 |

The Modulus, Break Strength, and Elongation tests were conducted in accordance with ASTM D 412.

As shown in the examples, above, improved dispersion of the aramid pulp, yields improved physical properties for the compounded compositions.

I claim:

1. A process for preparing a composition consisting essentially of flake-like particles of elastomer with, as a sole particulate component, aramid fibers having an average length of 0.1 to 6 millimeters in an amount from 30 to 300 weight parts of fibers per hundred parts of elastomer homogeneously distributed uniformly throughout, wherein the flake-like particles have a thickness of about 0.05 to 2 millimeters and an aspect ratio of 1 to 30, comprising the steps of:
   a) dispersing aramid fibers in a solution of an elastomer in an
   organic solvent having 1 to 20 weight parts of solvent for each part of elastomer; and
   b) evaporating the organic solvent from the dispersion of aramid fibers in elastomer under continued agitation forces.

2. The process of claim 1 wherein the elastomer is dissolved in the organic solvent to make an elastomer solution before dispersing the aramid fibers in the solution.

3. The process of claim 1 wherein the aramid fibers is combined with particles of the elastomer before adding the organic solvent to dissolve the elastomer and disperse the aramid fibers.

4. The process of claim 1 wherein the fibers are aramid pulp.

5. The process of claim 1 wherein the fibers are poly(p-phenylene terephthalamide).

* * * * *